US011220023B2

(12) United States Patent
Kawamura et al.

(10) Patent No.: US 11,220,023 B2
(45) Date of Patent: Jan. 11, 2022

(54) PREFORM AND METHOD FOR PRODUCING CONTAINER

(71) Applicant: NISSEI ASB MACHINE CO., LTD., Nagano (JP)

(72) Inventors: Ryo Kawamura, Nagano (JP); Manabu Ogihara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 277 days.

(21) Appl. No.: 15/779,476

(22) PCT Filed: Nov. 28, 2016

(86) PCT No.: PCT/JP2016/085238
§ 371 (c)(1),
(2) Date: May 25, 2018

(87) PCT Pub. No.: WO2017/090774
PCT Pub. Date: Jun. 1, 2017

(65) Prior Publication Data
US 2018/0257264 A1 Sep. 13, 2018

(30) Foreign Application Priority Data

Nov. 27, 2015 (JP) .............................. JP2015-232259
Mar. 30, 2016 (JP) .............................. JP2016-069382

(51) Int. Cl.
*B29C 49/06* (2006.01)
*B29B 11/08* (2006.01)
(Continued)

(52) U.S. Cl.
CPC .............. *B29B 11/08* (2013.01); *B29B 11/14* (2013.01); *B29C 49/06* (2013.01); *B29C 49/48* (2013.01);
(Continued)

(58) Field of Classification Search
None
See application file for complete search history.

(56) References Cited

U.S. PATENT DOCUMENTS

| 3,137,748 A | 6/1964 | Makowski |
| 4,007,242 A | 2/1977 | Lorgé |

(Continued)

FOREIGN PATENT DOCUMENTS

| CN | 101378886 | 3/2009 |
| JP | 60-137610 | 7/1985 |

(Continued)

OTHER PUBLICATIONS

International Search Report issued in International Application No. PCT/JP2016/085238, mailed from the Japan Patent Office dated Jan. 10, 2017.

(Continued)

*Primary Examiner* — Monica A Huson
(74) *Attorney, Agent, or Firm* — Greenblum & Bernstein, P.L.C.

(57) ABSTRACT

A preform 20 comprises a neck portion 22 having an opening 21, a cylindrical barrel portion 23, and a bottom portion 24 larger in diameter than the barrel portion 23, and has a corner portion 25 at a boundary between the barrel portion 23 and the bottom portion 24.

7 Claims, 9 Drawing Sheets

(51) Int. Cl.
    *B29C 49/48*     (2006.01)
    *B29B 11/14*     (2006.01)
    *B29C 49/64*     (2006.01)
    B29C 49/00     (2006.01)
    B29K 67/00     (2006.01)
    B29L 31/00     (2006.01)

(52) U.S. Cl.
CPC ...... *B29C 49/4815* (2013.01); *B29C 49/6427* (2013.01); *B29B 2911/14332* (2015.05); *B29B 2911/14338* (2015.05); *B29B 2911/14486* (2013.01); *B29C 49/0073* (2013.01); *B29C 49/6445* (2013.01); *B29C 49/6463* (2013.01); *B29C 2049/4884* (2013.01); *B29C 2049/4892* (2013.01); *B29C 2049/4894* (2013.01); *B29K 2067/003* (2013.01); *B29L 2031/7158* (2013.01)

(56) References Cited

U.S. PATENT DOCUMENTS

| | | |
|---|---|---|
| 4,439,393 A | 3/1984 | Saito et al. |
| 4,649,004 A | 3/1987 | Nohara et al. |
| 4,741,936 A | 5/1988 | Nohara et al. |
| 4,785,948 A * | 11/1988 | Strassheimer ...... B29C 49/0078 215/373 |
| 2009/0191370 A1 | 7/2009 | Camerani et al. |
| 2014/0131920 A1 | 5/2014 | Nakahara |
| 2016/0361860 A1 | 12/2016 | Nakahara |

FOREIGN PATENT DOCUMENTS

| | | |
|---|---|---|
| JP | 03-051117 | 3/1991 |
| JP | 2013-014020 | 1/2013 |
| WO | WO 2013/012067 | 1/2013 |
| WO | WO 2013/012067 A1 | 1/2013 |
| WO | WO 2013/089054 A1 | 6/2013 |

OTHER PUBLICATIONS

Extended European Search Report issued by the European Patent Office dated Jun. 25, 2019, in counterpart European Patent Application No. 16868717.6.

Office Action issued by the Japanese Patent Office dated Jul. 2, 2019, in counterpart Japanese Patent Application No. 2017-552761.

Office Action issued by the Chinese Patent Office dated Jul. 10, 2019, in counterpart Chinese Patent Application No. 201680069263.5.

* cited by examiner

PREFORM AND METHOD FOR PRODUCING CONTAINER

This application is a national phase of International Application number PCT/JP2016/085238, filed Nov. 28, 2016, and claims the benefit of priority to Japanese Application No. 2016-069382, filed Mar. 30, 2016, and Japanese Application No. 20. 15 232259, filed Nov. 27, 2015, the content of both applications is incorporated herein by reference.

TECHNICAL FIELD

This invention relates to a preform for forming a container in which the wall thickness of a bottom surface section is larger than the wall thickness of a barrel; and a method for producing the container.

BACKGROUND ART

Containers made of glass have been used by preference as containers accommodating toilet lotions, milky lotions, etc. (may hereinafter be referred to as cosmetic containers). This is because cosmetic containers made of glass have aesthetic appearances such as a massive feeling and a luxurious feel, and tend to increase consumers' appetite for buying.

In recent years, the aesthetic appearances of resinous containers have also improved. Because of this improvement, coupled with the advantage that resinous containers are lightweight and minimally break compared with glass containers, the resinous containers have been put to use as cosmetic containers. Currently, however, it is difficult to form the resinous containers with an aesthetic appearance comparable to that of cosmetic containers made of glass.

Many glass cosmetic containers are formed with thick walls, for example, for stressing their luxurious feel or massive feeling. The shape of the container is changed, as appropriate, in accordance with the contents of the container. Generally, however, the bottom surface section of the container is considerably thick-walled, whereas the barrel of the container has a small and uniform wall thickness in comparison with the bottom surface section. In imitation of the shape of the cosmetic container made of glass as mentioned above, the resinous container also has the bottom surface section thick-walled and the barrel uniformly thin-walled. By so doing, an improvement in the aesthetic appearance of the resinous container can be expected.

Such a resinous container is produced, for example, by injection-molding a bottomed cylindrical preform with the use of a starting resin material such as polyethylene terephthalate (PET), and blow-molding the preform. On this occasion, a bottom portion of the preform (parison) is formed in a larger wall thickness than its barrel portion, whereby the bottom surface section of the resulting container is rendered larger in wall thickness than its barrel. Various methods have been proposed in this connection (see, for example, Patent Document 1).

PRIOR ART DOCUMENTS

Patent Documents

Patent Document 1: Re-publication of PCT International Publication No. 2013-089054

SUMMARY OF THE INVENTION

Problems to be Solved by the Invention

However, simply by making the bottom portion of the preform (parison) more thick-walled than its barrel portion, for example, as described in Patent Document 1, there is a possibility that a container of a desired shape cannot be formed. According to the method described in Patent Document 1, for example, the bottom surface portion of the preform (parison) is formed in the same shape as the outer shape of the bottom surface section (bottom) of a blow-molded container. This poses the problem that near the bottom surface section of the container, the inner diameter of the container cannot be sufficiently enlarged to a desired dimension. In other words, the method described in Patent Document 1 involves the problem that the bottom surface section of the container cannot be formed to have a wide flat thick wall.

The present invention has been accomplished in the light of the foregoing circumstances. It is an object of the invention to provide a preform which makes it easy to form a container, having a bottom surface section larger in wall thickness than a barrel, into a desired shape; and a method for producing the container.

Means for Solving the Problems

A first aspect of the present invention, aimed at solving the above problems, is a preform for forming a container having a bottom surface section with a larger wall thickness than a wall thickness of a barrel, the preform comprising an opening neck portion, a cylindrical barrel portion, and a bottom portion larger in diameter than the barrel portion, and having a corner portion at a boundary between the barrel portion and the bottom portion.

A second aspect of the present invention is the preform according to the first aspect, wherein the angle between an outer peripheral surface of the barrel portion and an upper surface of the bottom portion constituting the corner portion is a right angle or an acute angle.

A third aspect of the present invention is the preform according to the first or second aspect, wherein the corner portion is provided toward an outer bottom surface, with respect to an inner bottom surface, of the bottom portion.

A fourth aspect of the present invention is a method for producing a container having a bottom surface section with a larger wall thickness than a wall thickness of a barrel, comprising: an injection molding step of forming a preform by injection molding, the preform including an opening neck portion, a cylindrical barrel portion, and a bottom portion larger in diameter than the barrel portion, and having a corner portion at a boundary between the barrel portion and the bottom portion; a temperature control step of controlling the temperature of the preform by bringing at least the bottom portion of the preform into intimate contact with a temperature control mold for cooling; and a blow molding step of forming the container by blow-molding the preform temperature-controlled by the temperature control step.

A fifth aspect of the present invention is the method for producing a container according to the fourth aspect, wherein the temperature control step heats the barrel portion while cooling the bottom portion of the preform.

A sixth aspect of the present invention is the method for producing a container according to the fourth or fifth aspect, wherein the blow molding step forms the container so that a site of the barrel close to the end thereof beside the bottom surface section has a diameter larger than the diameter of a site of the barrel close to the end thereof beside the neck.

Effects of the Invention

With the present invention as described above, it becomes easy to form a container having a bottom surface section larger in wall thickness than a barrel. Concretely, the container is formed using a preform provided with a corner portion at the boundary between a barrel portion and a bottom portion, whereby the container having the bottom surface section flattened and thick-walled can be formed satisfactorily.

MODE FOR CARRYING OUT THE INVENTION

Embodiments of the present invention will now be described in detail by reference to the accompanying drawings.

Embodiment 1

Figure 1:
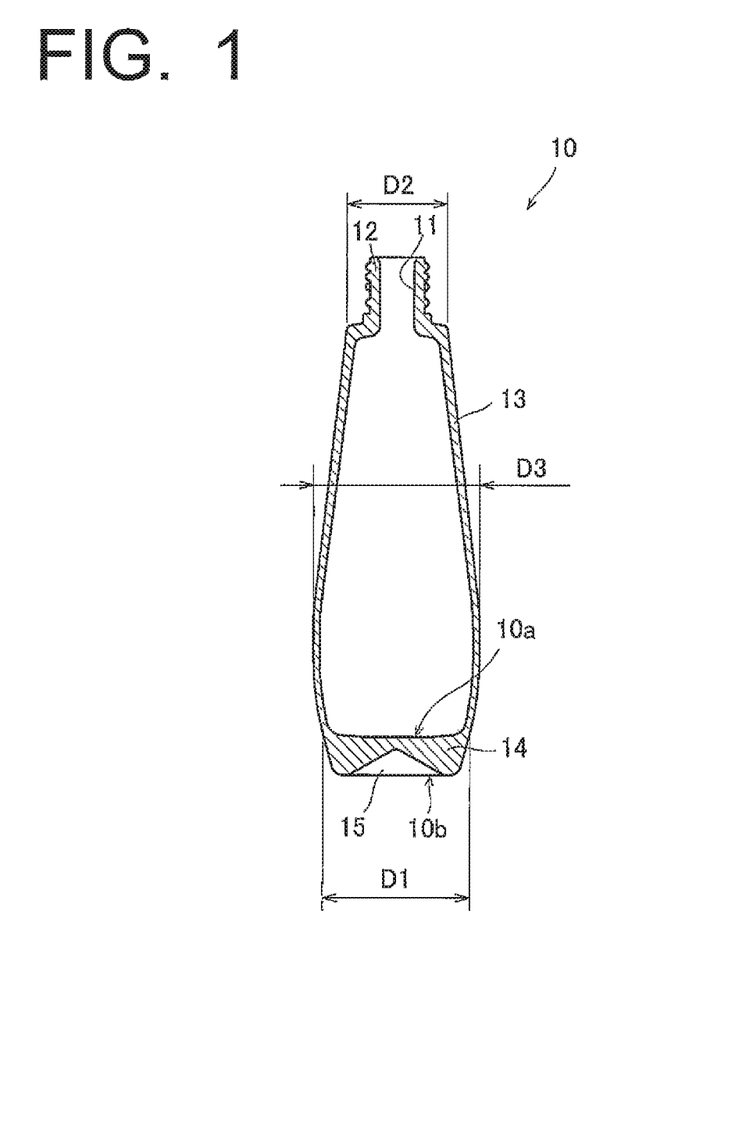
FIG. 1 is a sectional view showing an example of a container according to Embodiment 1 of the present invention.
Figure 2:
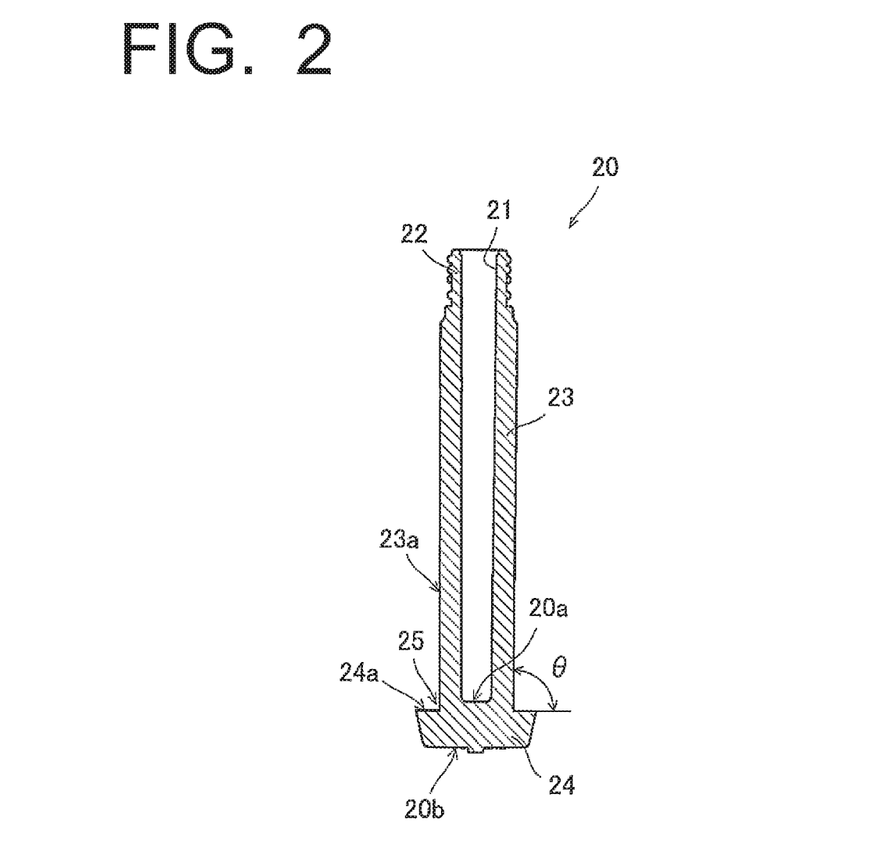
FIG. 2 is a sectional view showing an example of a preform according to Embodiment 1 of the present invention.

FIG. 1 is a sectional view of a container according to Embodiment 1 of the present invention. FIG. 2 is a sectional view of a preform for forming the container.

A container (cosmetic container) 10 shown in FIG. 1 is formed from a thermoplastic resin among synthetic resins, for example, polyethylene terephthalate (PET), polycyclohexylenedimethylene terephthalate (PCTA, copolymer), or "Tritan" (copolyester) manufactured by Eastman Chemical Company, and accommodates, for example, a toilet lotion or a milky lotion. This container 10 is composed of a neck 12 having a mouth 11 at the upper end, a tubular barrel 13 continuous with the neck 12, and a bottom surface section 14 continuous with the barrel 13.

The container 10 is a bottle having a nearly cylindrical transverse section, and the diameter of the barrel 13 near its end beside the bottom surface section 14 is larger than the diameter of the barrel 13 near its end beside the neck 12. In the present embodiment, the diameter D1 of the barrel 13 near its end beside the bottom surface section 14 is larger than the diameter D2 of the barrel 13 near its end beside the neck 12, and the barrel 13 is formed such that its diameter D3 at a site slightly above (toward the neck 12) the end beside the bottom surface section 14 is the maximum diameter.

The bottom surface section 14 of the container 10 is formed to be considerably thicker than the wall thickness of the barrel 13. In other words, the wall thickness of the barrel 13 is considerably small, and is uniform, in comparison with the bottom surface section 14.

Since the container 10 is formed in such a shape, it is possible, for example, to bring its image close to an image of a cosmetic container which consumers have. That is, the aesthetic appearance of the container 10 can be enhanced, so that the container 10 can be used as a cosmetic container or the like whose appearance is important.

In the present embodiment, an inner surface of the bottom surface section 14, namely, an inner bottom surface 10a of the container 10, is formed to be flat. In an outer surface of the bottom surface section 14, namely, an outer bottom surface 10b of the container 10, on the other hand, a concavity 15 depressed toward the inner bottom surface 10a is formed.

The container 10 of the above-mentioned shape is formed by blow-molding a preform 20 formed by injection molding.

As shown in FIG. 2, the preform 20 for forming the container 10 is composed of a neck portion 22 having an opening 21 at its upper end and having a thread groove formed in its outer periphery; a barrel portion 23 continuous with the neck portion 22, and a bottom portion 24 continuous with the barrel portion 23. The bottom portion 24 of the preform 20 is formed with a diameter larger than that of the barrel portion 23. That is, the bottom portion 24 of the preform 20 is configured to bulge out like a flange in a lateral direction (outer-diameter direction) with respect to the barrel portion 23, and has an external shape almost resembling a mushroom cap.

The preform 20 according to the present invention further has a corner portion 25 at the boundary between the barrel portion 23 and the bottom portion 24 with different diameters as mentioned above. That is, the diameter of the preform 20 increases sharply, rather than gradually, at the boundary between the barrel portion 23 and the bottom portion 24. As a result, the corner portion 25 formed by a side surface 23a of the barrel portion 23 and an upper surface 24a of the bottom portion 24 (a surface on the side of the opening 21) is present at the boundary between the barrel portion 23 and the bottom portion 24. In a top view of the preform 20, the corner portion 25 is provided circumferentially (annularly) at the boundary between the barrel portion 23 and the bottom portion 24.

By blow-molding the preform 20 of the above shape, the container 10 can be formed in a desired shape, as will be described in detail later. That is, the container 10 is formed using the preform 20 having the corner portion 25 at the boundary between the barrel portion 23 and the bottom portion 24, whereby the container 10 can be formed in a satisfactory configuration having the thick-walled bottom surface section 14 with the inner bottom surface 10a flattened. Moreover, the inner diameter of the container 10 at a site near the boundary between the barrel 13 and the bottom surface section 14 can be enlarged sufficiently to a desired dimension. The ratio of the diameter of the bottom portion 24 to the diameter of the barrel portion 23 is set, as appropriate, in a range of 1.1 to 4.0 preferably, and in a range of 1.2 to 2.0 particularly preferably.

The angle θ of the corner portion 25 may be a somewhat obtuse angle if it is a nearly right angle, but is preferably close to a right angle (90°). More concretely, it is desirable that the angle θ of the corner portion 25 be set in a range of 85° to 120°, particularly in a range of 90° to 100°. By so doing, when the preform 20 is blow-molded, the preform 20 can be stretched appropriately, and it becomes easy to form the container 10 in which the bottom surface section 14 is thick-walled compared with the barrel 13 and the inner bottom surface 10a is flattened. In case the inner bottom surface 10a of the container 10 need not be flattened, for example, it is acceptable to set the angle θ of the corner portion 25 to be an acute angle (for example, in a range of 60° to 85°).

In the present embodiment, the corner portion 25 is provided on the side of the outer bottom surface 20b in relation to the inner bottom surface 20a of the preform 20. This facilitates the wall thickening of the bottom portion 24. Needless to say, the position of the corner portion 25 is not limited to this position, and may be on the side of the opening 21 with respect to the inner bottom surface 20a.

Figure 3:
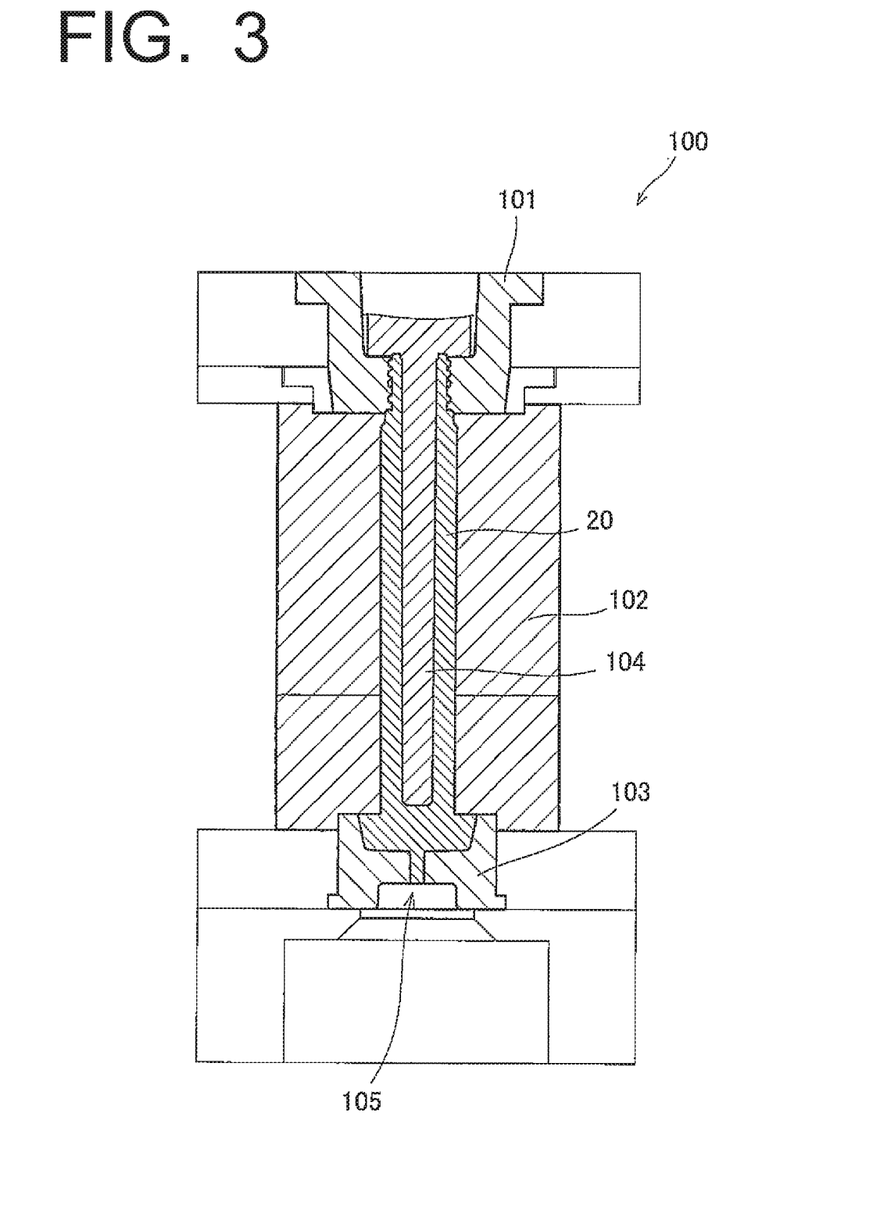
FIG. 3 is a view illustrating an injection molding step of a method for producing a container according to Embodiment 1 of the present invention.

Next, a method for producing the container 10 using such a preform 20 will be described by reference to FIGS. 3 to 5.

The method for producing the container 10 according to the present invention complies with a 1-step blow molding method (hot parison blow molding method), and has an injection molding step, a temperature control step, and a blow molding step. First of all, as shown in FIG. 3, the preform 20 is formed by injection molding using an injection mold 100 (injection molding step). The preform 20 has the neck portion 22, the barrel portion 23, and the bottom portion 24 as stated earlier and, in the injection molding step, is formed such that its entire length (vertical axis length) is slightly larger than the entire length of the container 10 measured at a site of the container 10 corresponding to the concavity 15.

The injection mold 100 is equipped, for example, with a neck mold 101 defining the outer surface of the neck portion 22 and comprising a split mold openable and closable in a horizontal direction; an injection cavity mold 102 defining the outer surface of the barrel portion 23; a bottom mold 103 defining the outer surface of the bottom portion 24; and a core mold 104 defining the inner surface of the preform 20. A cooling circuit for cooling water (not shown) is provided in the injection cavity mold 102, the core mold 104, and the bottom mold 103.

The preform 20 of the present invention has the bottom portion 24 shaped like a flange (undercut) larger in diameter than the barrel portion 23. Thus, it is impossible to simply grasp the preform 20 with the neck mold 101 and pull out (mold-release) the preform 20 upward from the injection cavity mold 102 as done for a conventional preform (a preform of a shape having a bottom portion diameter equal to or smaller than a barrel portion diameter). Hence, the injection cavity mold 102 is composed of a pair of openable and closable split molds. The bottom mold 103 is composed of a single mold independent of the injection cavity mold 102. Accordingly, the cooling temperature of the injection cavity mold 102 and that of the bottom mold 103 can be rendered different. Since the injection space between the bottom mold 103 and the core mold 104 is wide, moreover, wrinkles which are traces at the time of resin charging (corrugated patterns around a gate portion) tend to form on the outer surface of the bottom portion 24 of the preform 20. Thus, the core mold 104 is desirably structured to be movable upward and downward in accordance with the pressure change of the resin charged into the injection space (for details, see JP-A-2013-154622).

A thermoplastic resin such as PET resin is charged, from a gate 105 on the underside of the center of the bottom mold 103, into the injection space formed by the neck mold 101, the injection cavity mold 102, the bottom mold 103 and the core mold 104, whereby the preform 20 is injection-molded. That is, the preform 20 having the corner portion 25 at the boundary between the barrel portion 23 and the bottom portion 24 is formed by injection molding. By providing the corner portion 25, the outer wall surface of the bottom portion 24 can be brought into contact with both of the injection cavity mold 102 and the bottom mold 103. Consequently, the cooling efficiency of the bottom portion 24 can be improved compared with the conventional methods, so that the unnecessary (apt to cause defective molding) residual heat of the bottom portion 24 can be decreased.

Figure 4:
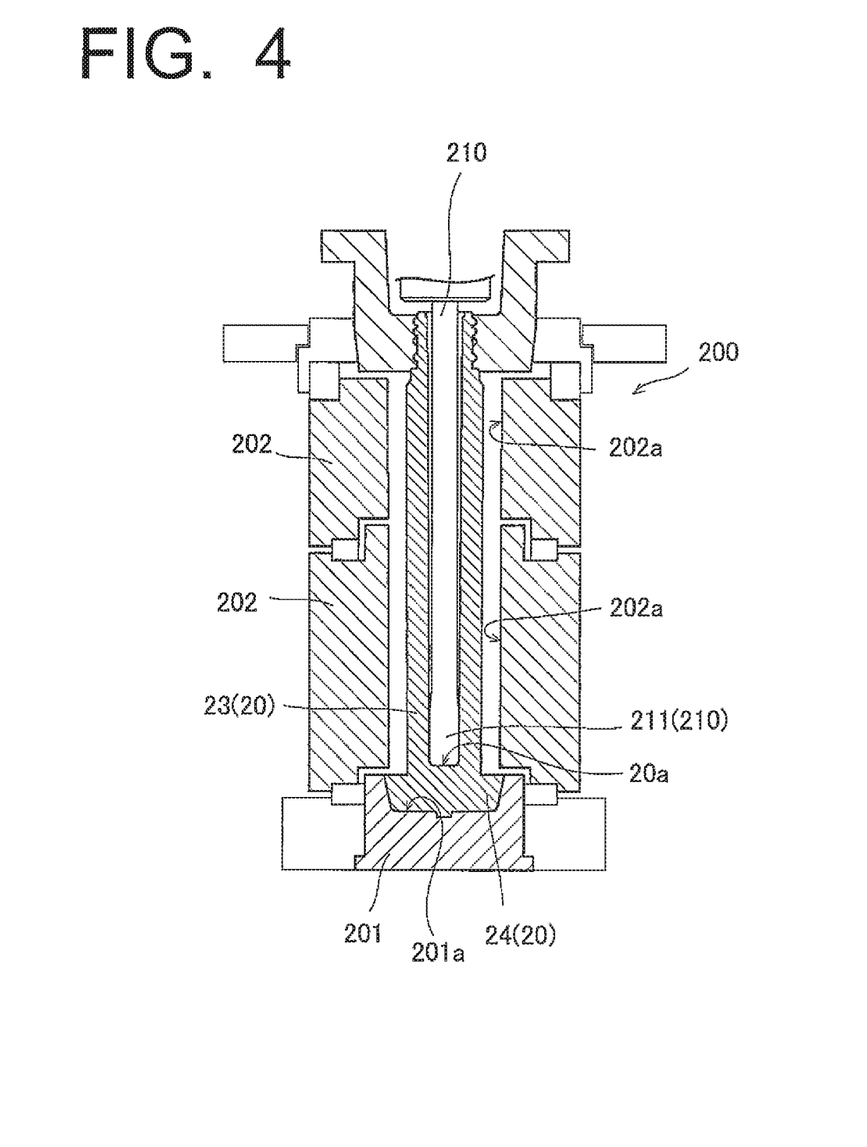
FIG. 4 is a view illustrating a temperature control step of the method for producing a container according to Embodiment 1 of the present invention.

Then, as shown in FIG. 4, the preform 20 is adjusted to a predetermined temperature by use of a temperature control pot 200 and a temperature control core 210 as a temperature control mold (temperature control step). Concretely, the surface of the bottom portion 24 (except the upper surface 24a) is brought into intimate contact with the temperature control pot 200 for cooling. With the present embodiment, moreover, in the temperature control step, the bottom portion 24 of the preform 20 is cooled and, at the same time, the barrel portion 23 of the preform 20 is heated.

The temperature control pot 200 is equipped with a cooling block 201 and two heating blocks 202. The cooling block 201 is configured to be temperature-controllable in a predetermined temperature range, for example, in a range of 10 to 50° C., and has an inner wall surface 201a along the bottom portion 24 of the preform 20. The heating block 202 is configured to be temperature-controllable in a predetermined temperature range, for example, in a range of 200 to 300° C., and has an inner wall surface 202a opposing in a noncontact manner the outer peripheral surface of the barrel portion 23 of the preform 20.

The temperature control core 210 is a rod-shaped member to be inserted into the preform 20 and, at the leading end, has a cooling core portion 211 capable of cooling to a predetermined temperature. The cooling core portion 211 is formed along the inner bottom surface 20a of the preform 20. A portion of the temperature control core 210, other than the cooling core portion 211, is formed with a smaller diameter than the diameter of the cooling core portion 211, and is inserted into the preform 20 so as not to contact the inner wall surface of the preform 20. The leading end of the temperature control core 210 is of a shape along the inner bottom surface 20a in order to increase the area of contact with the inner bottom surface 20a of the bottom portion 24 of the preform 20 and, preferably, has the shape of a flat surface. For the details of the temperature control step, reference is also requested to an official gazette such as WO2013-012067 by the present applicant.

In the temperature control step, when the preform 20 is disposed within the temperature control pot 200, the surface of the bottom portion 24 (except the upper surface 24a) of the preform 20 makes intimate contact with the inner wall surface 201a and is partially cooled. Also, the barrel portion 23 of the preform 20 is partially heated by radiant heat from the heating blocks 202. Furthermore, the temperature control core 210 is inserted into the preform 20, the cooling core portion 211 intimately contacts the inner bottom surface 20a of the preform 20, and the preform 20 is partially cooled from inside as well.

Exercising the temperature control of the preform 20 by such a temperature control step can adjust the temperature of the preform 20 and the shape (wall thickness) of the bottom portion 24 to desired states. Particularly, in the present invention, the preform 20 is of a shape having the corner portion 25 at the boundary between the barrel portion 23 and the bottom portion 24. In the temperature control step, therefore, the temperature difference between the barrel portion 23 and the bottom portion 24 becomes clearer. Hence, when the container 10 is to be formed by blow molding as will be described later, the barrel portion 23 of the preform 20 can be stretched satisfactorily selectively. For example, there can be formed the container 10 in which the distributions of the wall thicknesses of the thin-walled barrel 13 and the thick-walled bottom surface section 14 are kept orderly, and the degree of transparency and the degree of gloss are maintained in a uniform state.

If a preform is in a shape, for example, in which its outer shape (diameter) at the boundary between its barrel portion and its bottom portion (the site corresponding to the corner portion 25 in the present application) gradually increases, variations in a temperature distribution at the boundary between the barrel portion and the bottom portion tend to occur, and the residual heat of the boundary tends to become high. In accordance with these tendencies, a trouble such that the preform undergoes unbalanced stretching when blow-molded is apt to occur. Concretely, in the case of the preform of the above-mentioned shape, when it is blow-molded, rupture or bulging-out of the boundary with high residual heat is apt to occur, and a thick wall biased toward the boundary tends to occur in the container. In the present invention, on the other hand, the corner portion 25 is provided. Thus, the bottom portion 24 can be cooled efficiently, while the barrel portion 23 can be heated, with the result that a trouble such as unbalanced stretching of the preform 20 when blow-molded is minimally caused.

Figure 5:
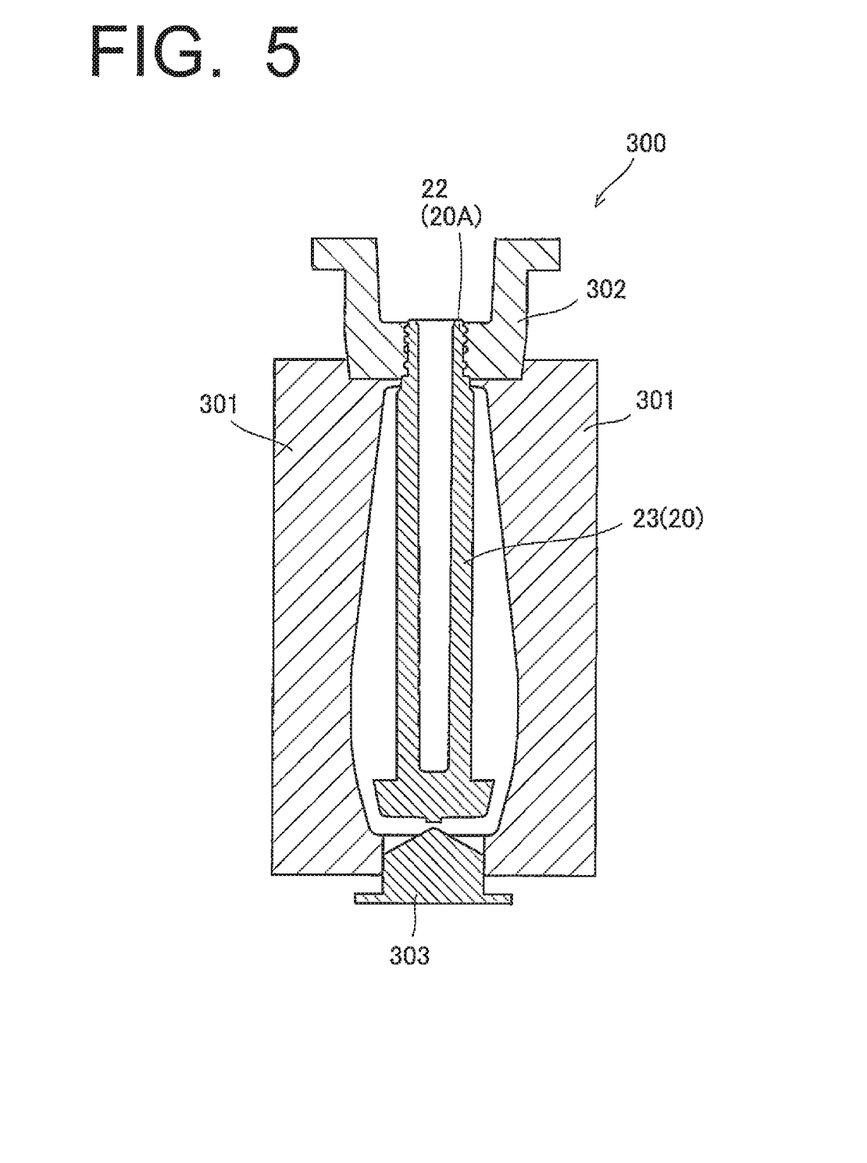
FIG. 5 is a view illustrating a blow molding step of the method for producing a container according to Embodiment 1 of the present invention.

The preform 20 temperature-controlled by the temperature control step is disposed within a blow mold 300, as shown in FIG. 5. The blow mold 300 is equipped with a pair of blow split molds 301 for accommodating the preform 20 inside, a neck mold 302 for holding the neck portion 22 of the preform 20, and a raised bottom mold 303 corresponding to the bottom portion 24 of the preform 20. The blow mold 300 is also provided with a blow core mold which is fitted into the neck mold 302 for introducing high pressure air, although this is not shown. A supply passage (not shown) for supplying a cooling medium is provided in the blow split molds 301, and the preform 20 disposed inside the blow split molds 301 is cooled by the cooling medium to a predetermined temperature after being blow-molded.

The raised bottom mold 303 is configured to be ascendable and descendable. As shown in FIG. 5, when the preform 20 is disposed within the blow split molds 301, the raised bottom mold 303 is held at a lowered positioned.

Figure 6:
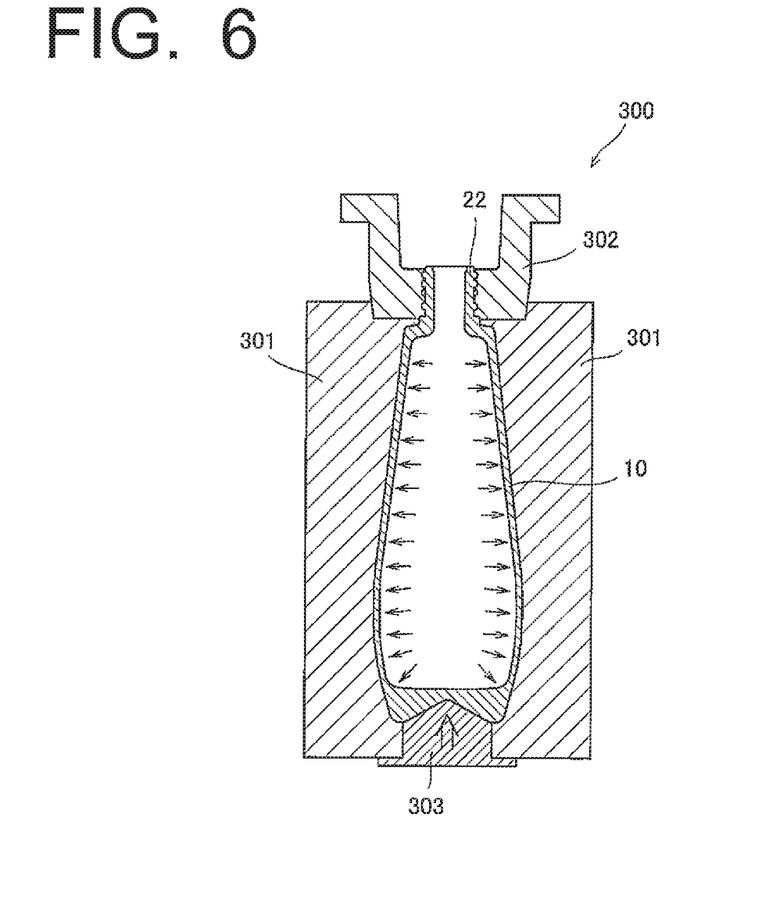
FIG. 6 is a view illustrating the blow molding step of the method for producing a container according to Embodiment 1 of the present invention.

In the blow molding step, high pressure air is supplied into the preform 20 disposed in the blow mold 300. On this occasion, the preform 20 is stretched mainly in the transverse axis direction and, as shown in FIG. 6, is pressed against the inner wall surfaces of the blow split molds 301. Moreover, at the same time as, or at a timing slightly earlier than, the start of the supply of high pressure air, the raised bottom mold 303 is moved upward to compress the bottom portion 24 of the preform 20. That is, the concavity 15 is formed in the outer bottom surface 10b of the container 10 by moving the raised bottom mold 303 upward. By so doing, the container 10, a final molded product, is formed. The concavity 15 of the outer bottom surface 10b is not indispensable, and the outer bottom surface 10b may be flat, if necessary.

The preform 20 is blow-molded to form the container 10 by the foregoing method for production according to the present invention. As a result, the container 10 of the desired shape, for example, having the bottom surface section with a larger wall thickness than the wall thickness of the barrel, can be formed satisfactorily.

As described above, the preform 20 according to the present invention is of a shape having the corner portion 25 at the boundary between the barrel portion 23 and the bottom portion 24. This preform 20 assumes a structure which can clearly differentiate between the temperature of the high temperature barrel portion 23 and the temperature of the low temperature bottom portion 24 in the injection step and the temperature control step. Thus, when high pressure air is supplied into the preform 20 in the blow molding step, the portion of the preform 20 corresponding to the barrel portion 23 is mainly stretched in the transverse axis direction, whereby the container 10 is formed. Thus, the preform 20 can be appropriately stretched, with the result that the container 10 of the desired shape, for example, with the bottom surface section 14 thick-walled compared with the barrel 13, can be formed satisfactorily.

Figure 7:
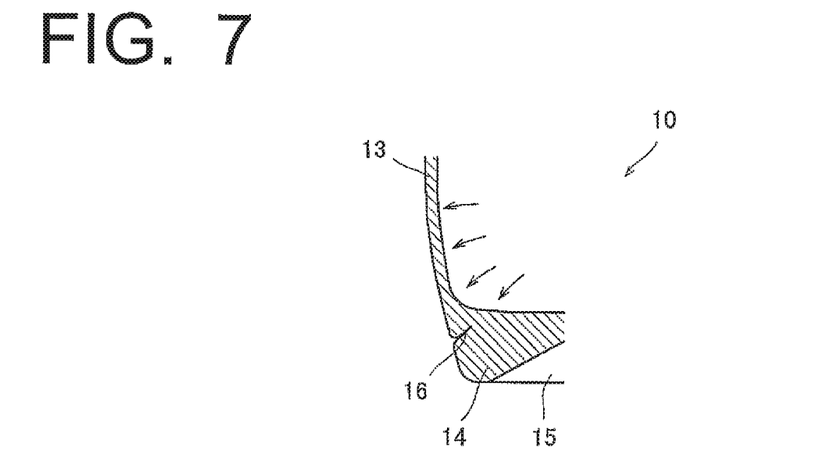
FIG. 7 is an enlarged view schematically showing an essential part of the container according to Embodiment 1 of the present invention.

The amount of stretching of the bottom portion 24 of the preform 20 is smaller than the stretching amount of the barrel portion 23. Thus, during blow molding, the preform 20 (barrel portion 23) is deformed so as to be folded at the corner portion 25. As a result, in the container 10 formed by the production method according to the present invention, a folding portion 16, which is traces of the barrel portion 23 of the preform 20 being folded, is continuously formed in the entire circumference near the boundary between the barrel 13 and the bottom surface section 14, as shown in an enlarged view as FIG. 7.

Embodiment 2

Figure 8:
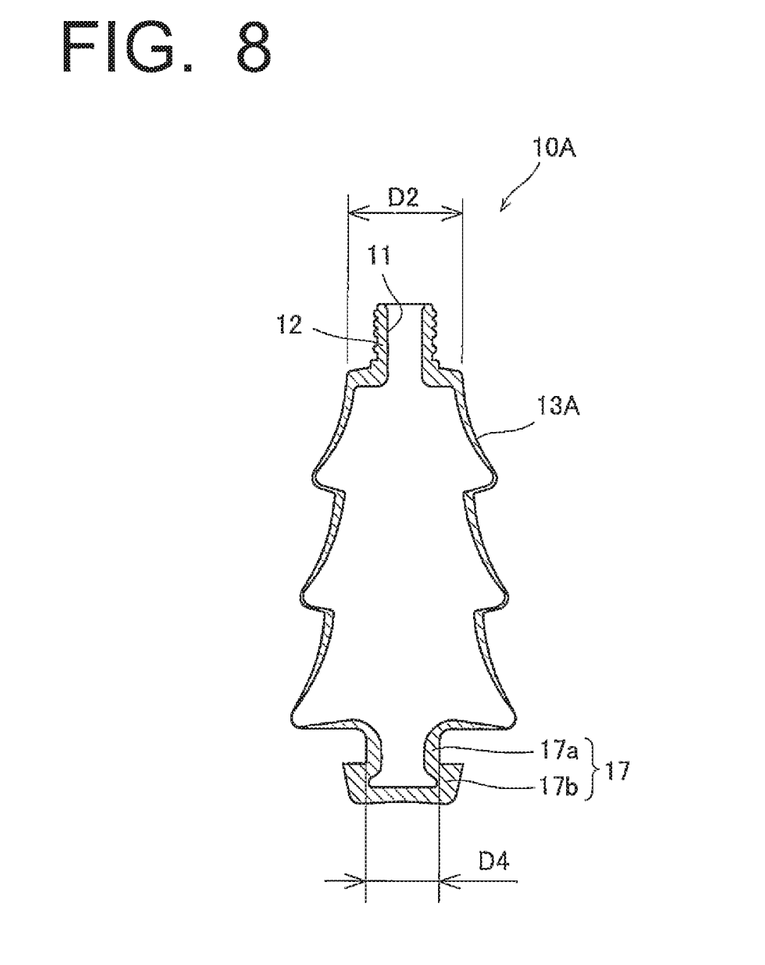
FIG. 8 is a sectional view showing an example of a container according to Embodiment 2 of the present invention.
Figure 9:
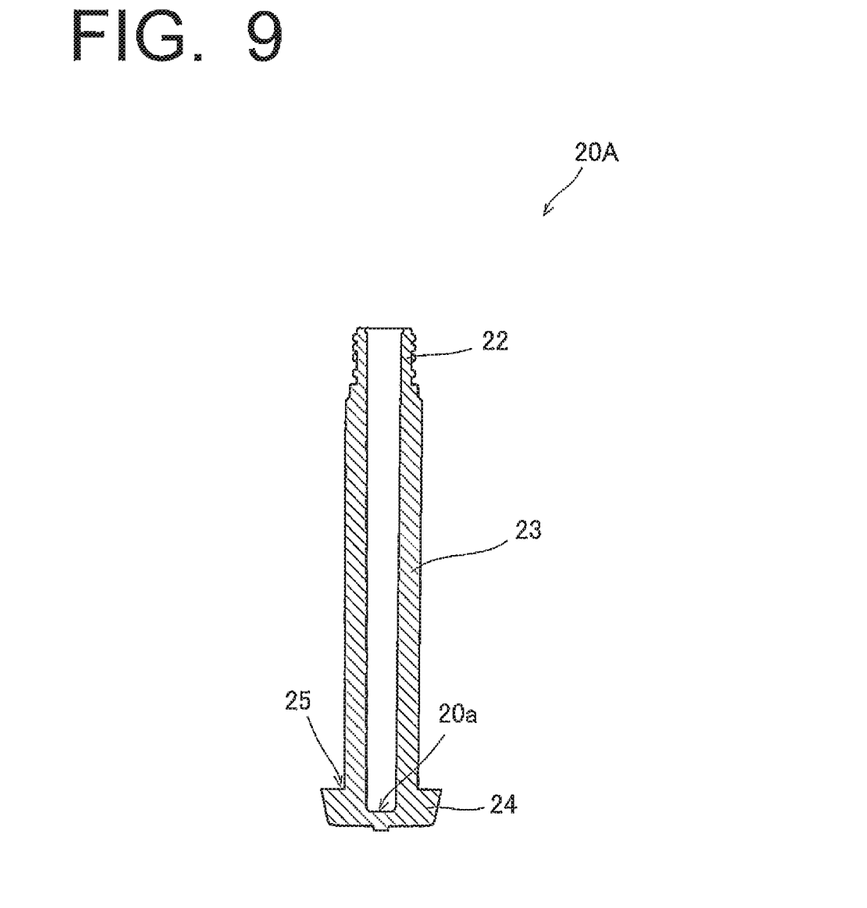
FIG. 9 is a sectional view showing an example of a preform according to Embodiment 2 of the present invention.
Figure 10:
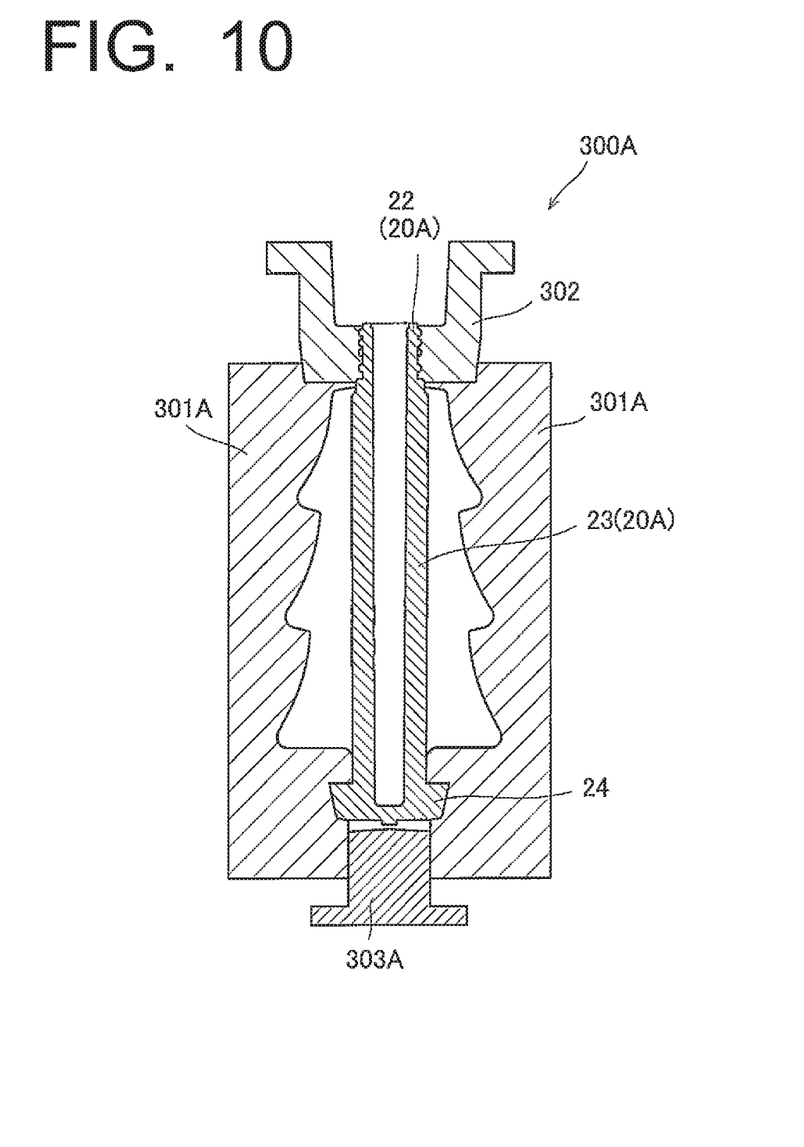
FIG. 10 is a view illustrating a blow molding step of a method for producing a container according to Embodiment 2 of the present invention.

FIG. 8 is a sectional view showing an example of a container according to Embodiment 2. FIG. 9 is a sectional view showing an example of a preform according to Embodiment 2. FIG. 10 is a view illustrating a blow molding step of a method for producing a container according to Embodiment 2. In these drawings, the same members will be assigned the same numerals, and duplicate explanations will be omitted.

The present embodiment is a modification of a container which is produced using a preform having a bottom portion larger in diameter than a barrel portion (see FIG. 2). As shown in FIG. 8, a container 10A comprises a neck 12 having a mouth 11 at the upper end, and a barrel 13A of a predetermined shape continuous with the neck 12. The outer shape of the barrel 13A is a shape in which three umbrella-shaped sites gradually increasing in diameter toward a lower side (bottom side) are continuous in the vertical direction. It goes without saying that the shape of the barrel 13A is not particularly limited, but may be a desired shape.

The container 10A according to the present embodiment further has a leg 17 extending downward from the barrel 13A. The leg 17 is composed of a small-diameter section 17a with a diameter D4 smaller than the diameter (minimum diameter) D2 of the barrel 13A at the end thereof on the side of the neck 12, and a pedestal section 17b with a larger diameter than the diameter of the small-diameter section 17a. The pedestal section 17b corresponds to the bottom surface section 14 in the container 10 of Embodiment 1. That is, the pedestal section 17b of the container 10A is formed with a considerably larger wall thickness than the wall thickness of the barrel 13A. In other words, the wall thickness of the barrel 13A is considerably smaller than the wall thickness of the pedestal section 17b. The small-diameter section 17a is also formed to be considerably larger in wall thickness than the barrel 13A.

By so shaping the container 10A, the stability of the container is improved. That is, the bottom surface of the pedestal section 17b is thick-walled and heavyweight (the center of gravity lies on the bottom surface side), so that the container 10A can be stably grounded via the pedestal section 17b.

The container 10A of the above-described shape is formed by blow molding a preform formed by injection molding, in the same manner as in Embodiment 1.

As shown in FIG. 9, a preform 20A for forming the container 10A is composed of a neck portion 22, a barrel portion 23, and a bottom portion 24, as in Embodiment 1. The bottom portion 24 is formed with a diameter larger than that of the barrel portion 23. The preform 20A also has a corner portion 25 at the boundary between the barrel portion 23 and the bottom portion 24.

In the preform 20 according to Embodiment 1, the corner portion 25 is provided toward the outer bottom surface 20b with respect to the inner bottom surface 20a of the preform 20 (see FIG. 2). The preform 20A according to Embodiment 2, on the other hand, has the corner portion 25 provided toward the neck portion 22 with respect to the inner bottom surface 20a. Because of this configuration, the leg 17 composed of the small-diameter section 17a and the pedestal section 17b can be blow-molded satisfactorily.

By the way, the container 10A according to the present embodiment is basically produced by the same production method as in Embodiment 1. However, the method of the present embodiment is different from the method of Embodiment 1 in the points indicated below.

First, the preform 20A is injection-molded as above in the injection molding step. On this occasion, the corner portion 25 is formed on a side nearer to the neck portion 22 than is the inner bottom surface 20a. That is, the position of the inner bottom surface 20a of the preform 20A is rendered deeper than the position of the corner portion 25. By so doing, the cooling efficiency of the pedestal section 17b (corner portion 25) is raised, and a change in the appearance of the pedestal section 17b during temperature control or blow molding can be suppressed.

Then, the preform 20A is heated to a predetermined temperature in the temperature control step as in Embodiment 1. The preform 20A heated to the predetermined temperature in the temperature control step is blow-molded to form the container 10A of a desired shape. In the blow molding step, concretely, the preform 20A is disposed within a blow mold 300A and blow-molded there, as shown in FIG. 10. The blow mold 300A is equipped with a pair of blow split molds 301A, a raised bottom mold 303A, and a neck mold 302 in conformity with the shape of the container 10A. The preform 20A disposed within the blow mold 300A is blow-molded, with the bottom portion 24 (the portion corresponding to the leg 17) being sandwiched between the blow split molds 301A, namely, with the outer surface of the bottom portion 24 (the portion corresponding to the leg 17) being pressed therebetween. By this measure, the barrel portion 23 of the preform 20A is mainly laterally stretched to form the container 10A provided with the leg 17 (see FIG. 8). In the present embodiment, shaping takes place using the raised bottom mold 303A so that the lower center of the bottom portion 24 of the preform 20A is slightly recessed upward (toward the neck 12). By this means, the lower center of the pedestal section 17b of the container 10A can be positioned above its outer edge, so that the container 10A can be grounded more stably. It goes without saying that in accordance with the desired shape of the container 10A, the height of the outer wall surface of the lower center of the pedestal section 17b may be rendered the same as the position of the outer edge of the pedestal section 17b to make the lower end surface of the pedestal section 17b flat.

According to the production method of the present embodiment, the neck 12 and the leg 17 (small-diameter section 17a and pedestal section 17b) of the container 10A are substantially molded (shaped) into desired forms in the injection molding step, and only the barrel 13A of the container 10A is molded (shaped) into a desired form in the blow molding step. By so dividing the shaped sections of the container 10A between the injection molding step and the blow molding step, the container 10A of the desired shape can be formed more satisfactorily.

The present invention has been described above in connection with its embodiments, but it is to be noted that the invention is in no way limited to these embodiments. Needless to say, the present invention can be changed or modified variously without departing from its scope and spirit.

EXPLANATIONS OF LETTERS OR NUMERALS 10, 10A Container
11 Mouth
12 Neck
13, 13A Barrel
14 Bottom surface section
15 Concavity
16 Folding portion
17 Leg
20, 20A Preform
21 Opening
22 Neck portion
23 Barrel portion
24 Bottom portion
25 Corner portion
100 Injection mold
101 Neck mold
102 Injection cavity mold
103 Bottom mold
104 Core mold
105 Gate
200 Temperature control pot
201 Cooling block
202 Heating block
210 Temperature control core
211 Cooling core portion
300, 300A Blow mold
301, 301A Blow split mold
302 Neck mold
303, 303A Raised bottom mold

The invention claimed is:
1. A preform for forming a container having a bottom surface section with a larger wall thickness than a wall thickness of a barrel, the preform comprising:
an opening neck portion,
a cylindrical barrel portion, and
a bottom portion having a flat upper surface, the bottom portion being larger in diameter than the barrel portion, and the bottom portion having a corner portion at a boundary between the barrel portion and the bottom portion;

wherein, in a cross-section passing through an axis line of the preform, the corner portion is defined by:

a first straight line which configures the barrel portion and is substantially parallel to the axis line; and a second straight line which configures the flat upper surface of the bottom portion, and wherein an angle defined by the first line and the second line is a right angle or an acute angle.

2. The preform according to claim 1, wherein the corner portion is provided toward an outer bottom surface, with respect to an inner bottom surface, of the bottom portion.

3. The preform according to claim 1, wherein the corner portion is provided toward an outer bottom surface, with respect to an inner bottom surface, of the bottom portion.

4. A method for producing a container having a bottom surface section with a larger wall thickness than a wall thickness of a barrel, comprising:

forming a preform by injection molding, the preform including an opening neck portion, a cylindrical barrel portion, and a bottom portion having a flat upper surface, the bottom portion being larger in diameter than the barrel portion, and the bottom portion having a corner portion at a boundary between the barrel portion and the bottom portion;

controlling a temperature of the preform by bringing at least the bottom portion of the preform into intimate contact with a temperature control mold for cooling; and forming the container by blow-molding the temperature-controlled preform;

wherein, in a cross-section passing through an axis line of the preform, the corner portion is defined by:

a first straight line which configures the barrel portion and is substantially parallel to the axis line; and a second straight line which configures the flat upper surface of the bottom portion, and wherein an angle defined by the first line and the second line is a right angle or an acute angle.

5. The method for producing a container according to claim 3, wherein the controlling the temperature of the preform includes heating the barrel portion while cooling the bottom portion of the preform.

6. The method for producing a container according to claim 3, further comprising forming the container so that a site of the barrel close to an end thereof beside the bottom surface section has a diameter larger than a diameter of a site of the barrel close to an end thereof beside the neck.

7. The method for producing a container according to claim 4, further comprising forming the container so that a site of the barrel close to an end thereof beside the bottom surface section has a diameter larger than a diameter of a site of the barrel close to an end thereof beside the neck.

\* \* \* \* \*